Dec. 26, 1961    E. H. TERLINDE    3,014,396
ACCORDION MICROPHONE CONTROL SUPPORT
Filed July 17, 1958    3 Sheets-Sheet 1
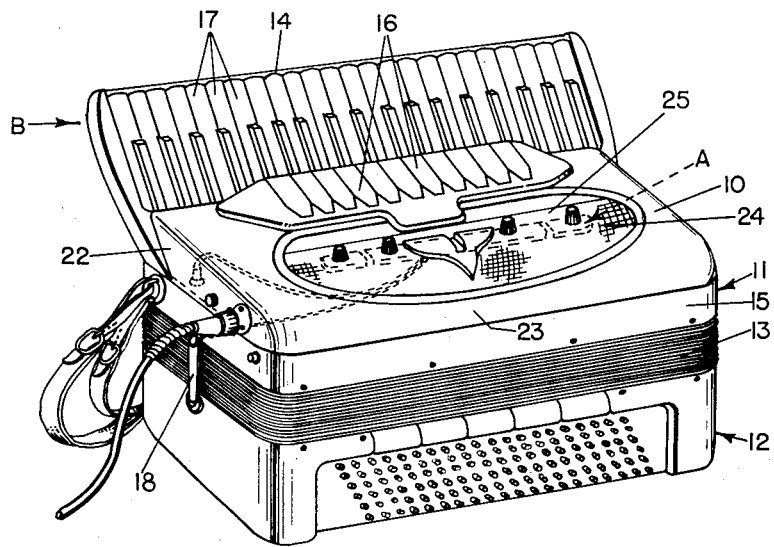
FIG. 1.
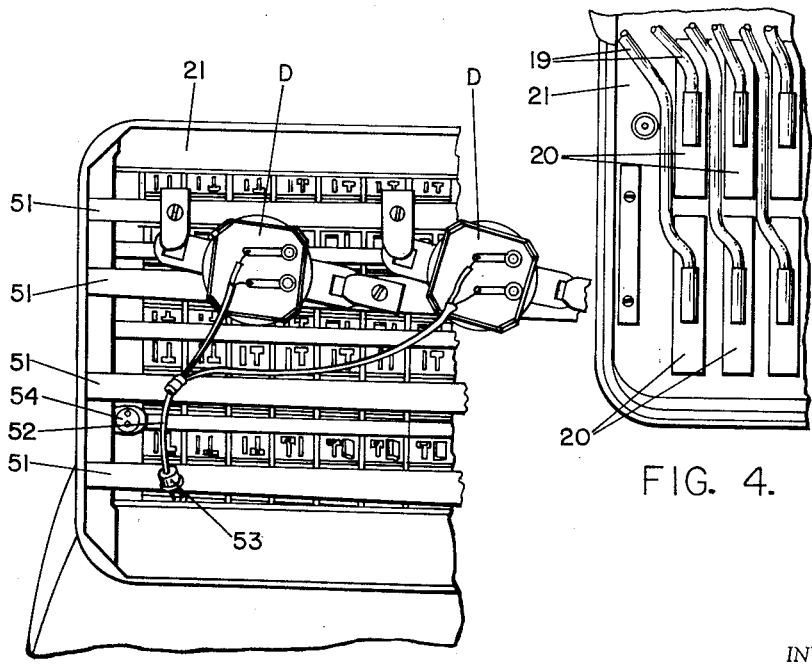
FIG. 3.
FIG. 4.
INVENTOR,
EDWARD H. TERLINDE.
BY Robert M. Dunning
ATTORNEY Dec. 26, 1961     E. H. TERLINDE     3,014,396
ACCORDION MICROPHONE CONTROL SUPPORT
Filed July 17, 1958     3 Sheets-Sheet 2

INVENTOR,
EDWARD H. TERLINDE.
BY *Robert M. Dunning*
ATTORNEY

Dec. 26, 1961  E. H. TERLINDE  3,014,396
ACCORDION MICROPHONE CONTROL SUPPORT
Filed July 17, 1958  3 Sheets-Sheet 3

INVENTOR,
EDWARD H. TERLINDE.
BY Robert M. Dunning
ATTORNEY

United States Patent Office 3,014,396
Patented Dec. 26, 1961

3,014,396
ACCORDION MICROPHONE CONTROL SUPPORT
Edward H. Terlinde, 184 W. 7th St., St. Paul, Minn.
Filed July 17, 1958, Ser. No. 749,214
13 Claims. (Cl. 84—376)

This invention relates to an improvement in accordion microphone control support and deals particularly with an accordion attachment for amplifying the sound of the accordion and for controlling the amplification.

During recent years the use of microphones for picking up the sounds from a microphone so that the sounds may be amplified has become increasingly popular. One of the difficulties which has been experienced in electrifying the accordion lies in the mounting of the controls. The accordion treble keyboard is usually angularly related to the frame which supports the various treble reeds. Arms connect each of the keys to a valve plate which normally covers a corresponding opening in the valve wall to which the reed blocks are connected. A grill which is also angularly related to the keyboard overlies and normally conceals these arms. This covering which normally includes a grill through which air may flow is normally positioned as closely as possible to the various key arms as is practical. Accordingly, there is very little waste space between the key arms and the grill when the keys are depressed. The grill is usually formed of very thin wood or plastic material to conserve weight, material and as the grill is normally not subjected to any particular strain or stress. Due to the fact that a large part of this grill is open work in order that the air may enter and leave the accordion with no difficulty, the grill is a relatively fragile and delicate part of the instrument.

In the past it has been proposed to mount the accordion controls on the frame of the treble section of the accordion at the upper end of the frame. However, when the controls are mounted in this manner, it is extremely difficult for the player to change the controls during the operation of playing the accordion as it is necessary for the player to move his right hand from a position overlying the keyboard to grasp the controls of the upper end of the accordion frame. In other instances the controls have been mounted upon a ductible strip of material which is secured to the frame near the upper or lower end of the accordion and which is bent intermediate its ends so that the control proper overlies the grill. This arrangement is much more convenient for the operator and supports of this type have proven extremely popular. This type of construction has a disadvantage, however, that it is outwardly of the grill and in some cases detracts from the appearance of the accordion. For this reason it would be preferable to mount the control directly on the grill if this could be done without danger of injury to the grill and without interfering with the action of the key arms.

An object of the present invention lies in the provision of an accordion control support which includes an elongated body of material which is extremely thin and which therefor may be mounted on the inner surface of the grill without interfering with the action of the key arms. In view of the fact that the control support is but slightly greater than a quarter of an inch in thickness, it may be usually mounted on the inner surface of the grill without being in the path of the key arms upon movement of these arms. As a result, the controls may be mounted in a position where they are readily accessible to the player and without detracting from the appearance of the accordion.

A feature of the present invention lies in the fact that the control support comprises a member which is elongated and which is relatively thin and which underlies the grill in a position to bridge across portions of the open work of the grill. The controls are provided with control shafts which project through openings formed in the grill. When the control shafts have been secured in position projecting through the grill and with the elongated body of the control support bridging portions of the open work, the grill is actually reinforced rather than weakened. When knobs are mounted upon the projecting shaft, the controls may be operated without moving the right hand any material distance from the keyboard.

A further feature of the present invention resides in the fact that if desired separate microphones can be provided, one of which is designed to pick up the higher notes being played while the other is designed to pick up the lower notes. Separate volume and tone controls may be provided for each microphone, and these controls may all be mounted in alignment in the elongated control support strip. This strip which is longer than that usually used to support two controls bridges a greater amount of the open work of the grill and, accordingly, reinforces the grill to a greater extent.

A further feature of the present invention resides in the provision of a control support which may, if desired, be adjustable in length. Due to the fact that the grill work on different accordions varies materially in design, it is desirable to vary the length of the supporting strip. This may be accomplished in one form of construction of my invention.

A further feature of the present invention resides in the manner employed for connecting the microphone to the controls. The microphones are usually mounted within the bellows portion of the accordion or actually mounted upon the reed blocks which extend into the bellows portion of the accordion. Accordingly, the wires connecting the microphone or microphones to the controls must pass from the interior of the bellows to a point exteriorly thereof. In some instances this has been done by passing an extremely fine wire between the end of the bellows and the frame to which the bellows end is connected. In the present arrangement, I prefer to provide a connector which may extend through the valve plate or valve wall with no leakage of air. While the connector is hollow to permit the conductors to pass through the wall, the contact is sealed so that no air may pass through the valve wall through the connector.

These and other objects and novel features of the present invention will be more clearly and fully set forth in the following specification and claims.

In the drawings forming a part of the specification:

FIGURE 1 is a perspective view of an accordion showing in general the location of the controls thereupon.

FIGURE 3 is a view showing a portion of the treble section of the accordion with the bellows removed looking toward the valve plate and reed blocks mounted thereon.

FIGURE 4 is a view tooking toward the opposite side of the valve plate from that illustrated in FIGURE 3 and showing some of the key arms and valves supported against the plate.

Figure 7:
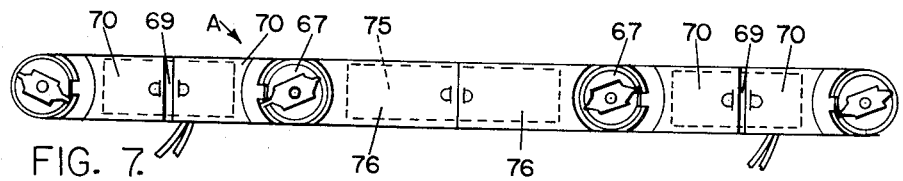
FIGURE 7 is a plan view of a modified form of control support.

The microphone control support is illustrated in general by the letter A and is preferably mounted to extend through the grill plate or valve cover 10 forming a portion of the treble section 11 of the accordion B. The accordion B may be of any usual shape or design and includes, in addition to the treble section 11, a base section 12, the two sections 11 and 12 being connected by a bellows 13. Tie straps 18 detachably connect the treble and base sections 11 and 12 and hold the bellows 13 closed when the instrument is not in use.

The accordion B also includes a keyboard 14 which forms a part of the treble section and which usually extends at an obtuse angle with respect to the frame 15 of the treble section. A series of reed control keys or stops 16 are usually mounted on the treble section adjoining the keyboard 14, the stops being angularly related to the keyboard but readily accessible therefrom. The number of stops varies with different makes of accordions and with accordions of different price range and also the particular form and arrangement of the stops 16 varies within substantial limits.

As is well known in the art, the various keys 17 of the keyboard 15 are connected by arms 19 to valves 20. These valves are normally spring urged against a valve plate 21 having apertures therethrough, the valves normally covering these apertures. When any key 17 is depressed, a corresponding arm 19 is actuated to swing the corresponding valve away from the valve plate.

The grill plate or valve cover 10 normally comprises a hollow covering member having end flanges such as 22 and an edge flange 23 which extend in abutting relation to the frame 15 of the treble section 11. The fourth side of the generally rectangular valve cover plate overlies the keys 17 and conceals the end of these keys to which the valve or key rods 19 are secured. The plate 10 is usually cut away or apertured to permit the various stops 16 to be exposed. Obviously, the shape and arrangement of this plate varies with different makes and styles of accordions. The accordion also is provided with open work indicated in general by the numeral 24 through which air may pass in entering or leaving the bellows 13. This open work is normally covered on its inner surface with grill cloth 25 or other suitable porous material through which air may flow.

In the event the grill is covered on its inner surface with grill cloth, spaced openings are formed through the grill, these openings extending through the solid portion of the grill which supports the cloth. In more recent constructions, the grill portion 25 is formed of light metal having small openings therethrough through which the sound may pass. In such an event, the openings for supporting the controls may be formed directly in the grill portion 25, the control shafts which will be later described extending directly through the light metal from which this grill is formed.

One of the main difficulties normally experienced in mounting controls directly upon the grill has been the lack of space between the grill and the valve arms 19. When the keys are depressed, these arms swing outwardly toward the grill and usually these arms swing to within perhaps three-eighths of an inch or even substantially less of the surface of the grill at their point of connection with the valves. As the controls for the volume and the tone picked up by the microphones normally include a pair of variable resistors or potentiometers, these elements could not be mounted on the inside of the grill as there was insufficient room at this point. However, I have found that recently potentiometers of this type have been constructed for miniature work which are extremely thin. By properly arranging such potentiometers, the control may accordingly be now mounted upon the grill or valve cover plate 10.

Figure 6:
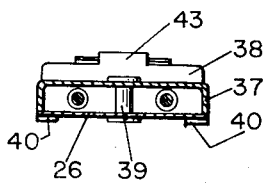
FIGURE 6 is a cross-sectional view on the line 6—6 of FIGURE 5.
Figure 5:
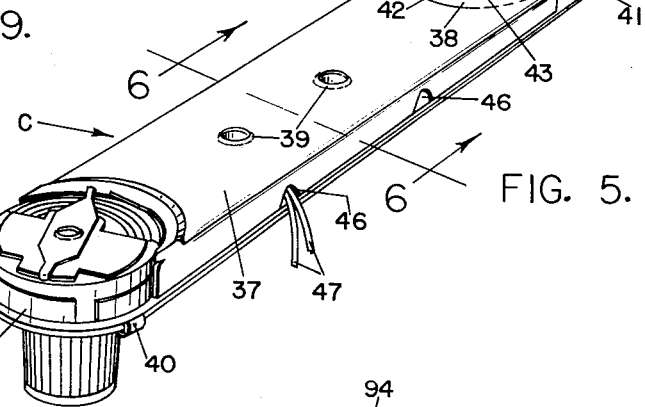
FIGURE 5 is a perspective view of a single control unit showing the general arrangement of parts therein.

In FIGURES 5 and 6 of the drawings, I disclose a control mounting of a form which has been proven extremely effective. The control support illustrated includes a base plate 26 having rounded ends 27 having a central aperture 29 extending therethrough. The potentiometer 30 is provided with a generally circular flat body 31 which is only a fraction of an inch in thickness and which changes the resistance as for example between terminals 32 and 33 and a ground terminal 34. The details of construction of the potentiometer will not be described as this does not form an important part of the invention except insofar as its reduced thickness is concerned. A threaded sleeve 35 extends axially from the circular body 31 and includes a control shaft 36 by means of which the potentiometer may be actuated. The threaded sleeve 35 is of sufficient thickness to extend through the corresponding aperture 29 is the base plate 26 and through the grill portion 25 and to be anchored outwardly of the grill portion by a clamping nut or the like.

A channel-shaped cover member 37 is secured to the base plate 26 by any suitable means such as by rivets 39. The potentiometer bodies are usually provided with opposed ears such as 40 which may extend into notches such as 41 in the sides of the base plate 26 and may be clinched over the other surface of the base plate to hold the potentiometers secured thereto. The wiring between the two potentiometers at opposite ends of the base plate 26 is enclosed between the base plate and the cover plate 37.

The ends of the cover plate 37 are curved and a shoulder 42 at each end of the cover plate connects the body of the cover plate an an offset arcuate flange 42 which is designed to overlie the terminals 32, 33 and 34. A lug or ear 43 is provided centrally of the offset flange 42, this lug or ear engaging the outwardly projecting and diametrically opposed ends 44 of the rotating portion 45 of the potentiometer 30. Thus the lug or ear 43 limits the rotation of the potentiometer to prevent this rotating portion 45 from rotation beyond its proper limits.

Notches such as 46 are provided in the sides of the channel-shaped cover member 37 and through which the conductors 47 leading to the microphone and to the amplifier may extend. The interconnecting wires, as well as any other such units such as the condenser usually included in the circuit, is enclosed within the cover 37.

The control illustrated in FIGURES 5 and 6 of the drawings is identified by the numeral C, while the control and its support illustrated in FIGURE 1 of the drawings is indicated by the letter A. The control A is somewhat more complicated than the control C and will be later described in detail. However, at this point it is only necessary to state that both controls are mounted in a similar manner with the body of the control on the inner side of the valve cover plate 10 and with the threaded sleeves 35 projecting through suitable openings in the grill portion 25. Nuts such as the nuts 49 in FIGURE 2 of the drawings overlie the outer surface of the grill and anchor the various sleeves in proper location.

When the control unit has been mounted in place, and the nuts 49 tightened against the outer surface of the grill portion 25, knobs 50 are mounted upon the shafts 36 so that the potentiometers may be operated. Due to the fact that the control support is light in weight and is rigid in form, it actually acts to reinforce the grill rather than to weaken it. The base plate 26 as well as the cover plate 37 are usually made of relatively light weight aluminum or the like and the structure is reinforced due to the channel-shaped form of the cover plate which, with the base plate, forms a hollow rectangular tube.

Figure 2:
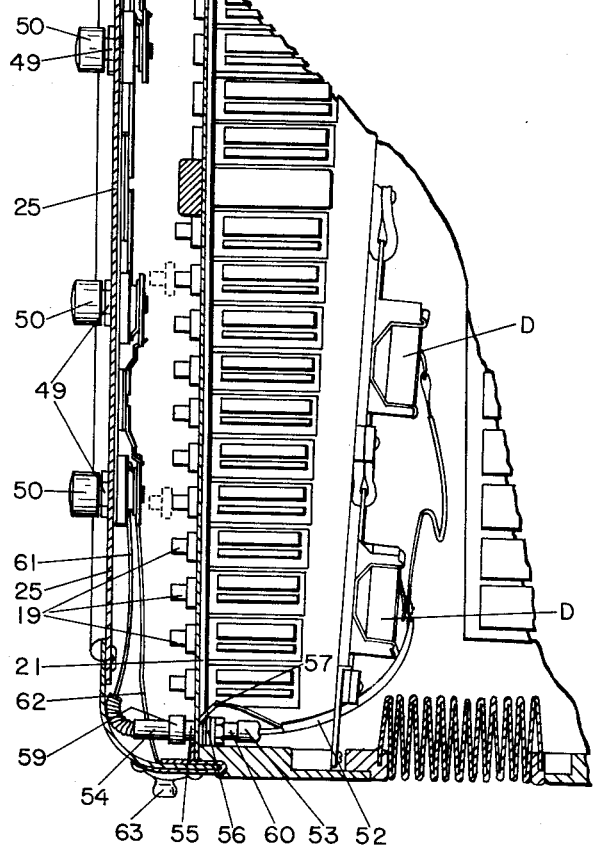
FIGURE 2 is a sectional view through the grill portion of the accordion showing the position of the controls relative to the grill and relative to the key arms which operate the various valves.

One or more microphones D are mounted on the treble section of the accordion, these microphones being usually attached to the reed blocks 51 anchored against the valve plate 21. The particular manner in which the microphones D are mounted is not of importance in the present invention. The microphones such as D are provided with conductors 52 which terminate in a plug 53. This plug 53 is detachably connected to a connector 54 which is shown in FIGURE 2 of the drawings as extending through the valve plate 21.

While the details of construction of the connector 54 are not illustrated in the drawings, it should be understood that the connector includes a tubular body 55 having a reduced diameter threaded portion which extends through the valve plate 21 and which is held in place by a nut 56 on the opposite side of the valve plate. A terminal lug 57 of metal encircles the threaded shank of the body 55 and forms an external connection which is grounded to the connector body 55 which in turn may be grounded to the shield such as 58 which normally encircles conductors of the type employed. The connector body 55 is detachably connected through a threaded cap 59 which contains sealed contact usually arranged concentrically to contact corresponding concentrically arranged conductors leading through the body 55 and to the terminal of the socket 60 to which the plug 53 is attached.

The detachable sleeves 54 are connected to one or more flexible conductors 61 leading to the control unit A or C. In the event the control support C is employed, a single connecting wire will suffice. However, if the accordion is equipped with two microphones designed to pick up notes of different frequency, two conductors are normally employed.

A conductor such as 62 is normally provided extending from the microphone control to an adapter 63 which is of a type shown in a co-pending application for patent. A conductor connects the adapter 63 to the amplifier where the sound picked up by the microphones D may be amplified.

From the foregoing description it will be seen that the control support is mounted inwardly of the grill on one side of the valve plate 21 and a connector leads through the valve plate to microphones positioned on the opposite sides thereof. Due to the fact that the connector is sealed intermediate its ends, no air leaks through the opening in the valve plate due to the electrical connection extending therethrough.

Figure 8:
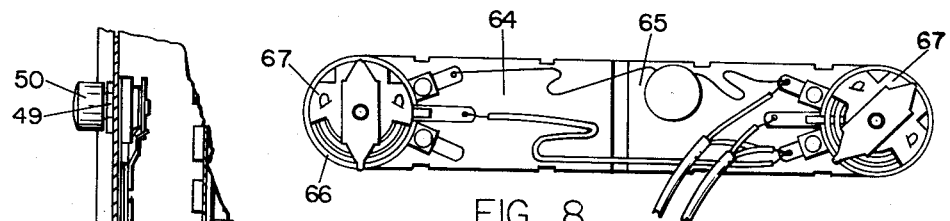
FIGURE 8 is a plan view of a portion of the control support illustrated in FIGURE 7.
Figure 9:
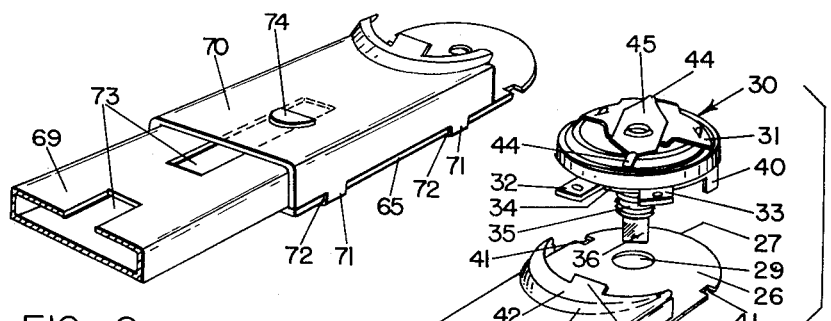
FIGURE 9 is a perspective view of a portion of the construction illustrated in FIGURES 7 and 8.

In FIGURES 7, 8 and 9 I disclose a modified form of microphone control support A which is somewhat similar to that previously described but which is adjustable in length. Furthermore, the particular arrangement illustrated in the drawings shows two sets of microphone controls mounted on a single mounting although obviously a portion of this support may be cut away and a single pair of controls may be supported.

As indicated in FIGURE 8 of the drawings, the microphone control support A includes a pair of elongated base strip members or base plate members 64 and 65 at least one of which is provided with a rounded end 66 as indicated. FIGURE 8 of the drawings shows an arrangement in which the center two controls of the four are omitted to provide a single control unit. Potentiometers 67 which are identical to those previously described are mounted on opposite ends of the base plates 64 and 65, the threaded sleeves of these potentiometers extending through apertures in the base plates.

With reference now to FIGURE 9 of the drawings, it will be noted that a rectangular tubular sleeve 69 overlies the two base plates 64 and 65 and overlaps the adjoining ends of the same. Channel-shaped cover members 70 are secured to each of the base plates 65, one such cover plate being indicated in FIGURE 9. The cover plates 70 are provided on opposite sides with ears 71 which extend into notches 72 in the side edges of the base plate and which are clinched beneath the base plates to hold the parts assembled. The base plates 64 and 65, with their respective cover plates 70, form a hollow enclosure which snugly accommodates the rectangular tube 69.

Some means is provided for limiting the expansion of the parts described. In the particular arrangement illustrated, the upper surface of the tubular sleeve 69 is provided with a tier of spaced elongated slots 73. Ears or detents 74 engage in the slots 73 and are shaped to limit the withdrawal of the tubular sleeve 69 from the end portions of the structure. If preferred, the detents 74 may engage against the upper surface of the sleeve 79 until the two parts are pulled apart sufficiently to cause the detent to enter into a relatively short slot or aperture 73 to serve the purpose of limiting the distance to which the mounting may be expanded.

In the arrangement illustrated in FIGURE 7 of the drawings, one end plate or base plate such as 65 is extended past the potentiometer 67 connected thereto and is telescopically arranged with an intermediate sleeve 75 which in turn is also telescopically connected to a similar unit. The end portions of the control support illustrated in FIGURE 7 both include base plates 64 and 65 and cooperable cover members 70 which enclose tubular sleeves 69 and are in slidable telescoping relation thereto. The ends of the base plates 65 which project beyond the potentiometers mounted thereon combine with cover plates 76 which are similar to the cover plates 70 to telescope with the tubular sleeve 75. As a result, the distance between the two intermediate potentiometers 67 may be adjusted as well as the distance between the two potentiometers at each end of the support.

The structure described is believed advantageous for several reasons. In the first place, it is possible for the first time to mount microphone controls directly upon the grill of the accordion with the major portion of the controls concealed. Only the control knobs project through the grill and, as a result, the appearance of the accordion is not particularly affected. Secondly, it is possible to provide a support for the controls which is readily accessible from the keyboard so that any of the controls may be readily operated while the instrument is being played. At the same time the support is so arranged that injury to the grill is not likely as the control support actually reinforces the grill rather than weakens it.

It is also noted that an electrical connection may be made from the area inwardly of the grill and the area inwardly of the bellows through the valve plate without causing likelihood of air leakage even after continued use. It should also be noted that either the controls or the microphones can be detached from the connector extending through the valve plate so that, if desired, the microphones may remain upon the reed blocks during repair or retuning thereof. The ability to disconnect the controls is also advantageous in the event it is desired to remove the valve cover panel or grill for any purpose.

Where two microphones are used, these are preferably of different type. One microphone is designed to pick up high frequency sound waves, while the other is designed to pick up low frequency sound waves. By combining the frequencies picked up, a full range of tone is produced more effectively than if it is attempted to pick up all the frequencies with a single microphone.

Figure 11:
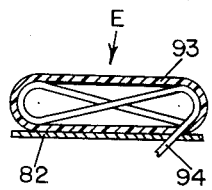
FIGURE 11 is a section on line 11—11 of FIGURE 10.
Figure 10:
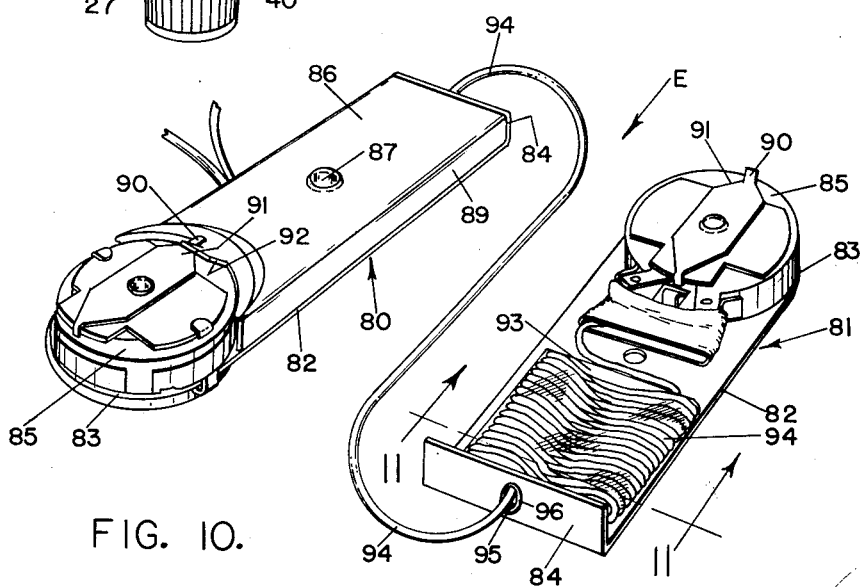
FIGURE 10 is a perspective view of a modified construction.

A modified form of microphone control support E is shown in FIGURES 10 and 11 of the drawings. In some instances the tone switch arrangement extends across the central part of the accordion beneath the grill, leaving insufficient space for even the thin support described. In such cases, I employ the separated structure shown in FIGURES 10 and 11.

The support E includes two members which are generally identical, and indicated by numerals 80 and 81. Each member includes an elongated strip 82 having a rounded end such as 83 and a right angularly turned flanged end 84. A potentiometer 85 is mounted at the rounded end with its shank extending through the strip as in the previous structures.

A cover panel 86 is riveted or otherwise secured, as at 87 to the strip 82. The cover panel 86 is channel-shaped in section, with parallel walls such as 89 abutting the surface of the strip 82, and the base of the channel in parallel spaced relation to the strip 82. The end of each cover panel 86 adjacent the potentiometer 85 is offset and rounded as previously described; and a central projecting ear 90 on the end 91 cooperates with a projecting stop 92 on the potentiometer, as in the previous structures.

A connecting wire connects the two members and forms a part of the operating circuit. One or both members 80 and 81 include an extra supply of wire, so that the distance between the controls may be increased without having excess exposed wire which might interfere with the operation of the accordion valves or switches.

A flat tubular enclosure 93 of plastic or the like is cemented or otherwise attached to one or both strips 82. Small plastic coated shielded wire is wound in figure 8 form, with the loops extending laterally of the enclosure. The wire 94 extends from a potentiometer 85, through the enclosure 93 in looped form, and through an aperture 95 in the flange 84 to the other member. A resilient grommet 96 may be provided in the hole 95 to extend about the wire and to resist outward movement of the wire.

When one control support such as 80 is mounted in a desired relation on the grill, the other control support such as 81 may be moved to its desired position, the wire being withdrawn loop by loop from the enclosure 93 until it has unreeled to the desired extent. The remaining wire remains looped in the enclosure 93.

In accordance with the patent statutes, I have described the principles of construction and operation of my microphone control support, and while I have endeavored to set forth the best embodiments thereof, I desire to have it understood that obvious changes may be made within the scope of the following claims without departing from the spirit of my invention.

I claim:
1. An accordion microphone control support for use in conjunction with an accordion having a treble section including a keyboard and a grill supported adjacent to the keyboard, the control support including an elongated member located inwardly of the grill and including a pair of potentiometers secured thereto in spaced relation, sleeves projecting in parallel relation from said elongated member, potentiometer shafts extending through said sleeves, said sleeves extending through said grill, and means outwardly of the grill for holding said sleeves and shafts projecting through said grill, thereby securing said elongated support to said grill.

2. The structure of claim 1 and in which said elongated member is hollow.

3. The structure of claim 1 and in which said elongated member is hollow, and including control wiring in said hollow member.

4. The structure of claim 1 and in which said elongated member is adjustable in length.

5. An accordion microphone control support for use in conjunction with an accordion having a treble section including a keyboard and a grill supported adjacent to the keyboard, the control support including an elongated member located inwardly of the grill and including a pair of potentiometers secured thereto in spaced relation, sleeves projecting in parallel relation from said support, potentiometer shafts extending through said sleeves, said sleeves extending through said grill, and means outwardly of the grill for holding said sleeves and shafts projecting through said grill, said elongated member including an elongated base plate to which said potentiometers are attached, and channel-shaped cover member means secured to said base plate intermediate said potentiometers and forming, with said base plate, a tubular structure.

6. The structure of claim 5, and in which said base plate supports a second pair of potentiometers in spaced relation to the first pair thereof.

7. The structure of claim 5 and in which said base plate and cover member means are divided intermediate said potentiometers, and including a tubular member in telescoping relation to the ends of the divided elongated member.

8. The structure of claim 5 and in which said elongated member is divided between said potentiometers and including means in telescoping relation to the ends of the divided elongated member and connecting the same.

9. The structure of claim 8 and including means limiting the separation of the ends of said divided elongated member.

10. The structure of claim 1 and including means on said elongated member limiting the rotation of said potentiometer shafts.

11. The structure of claim 5 and including means on said elongated member limiting the rotation of said potentiometer shafts.

12. A microphone control support including an enclosure, a potentiometer mounted adjoining said enclosure, said potentiometer having an operating shaft extending through one side of said enclosure, a stop arm forming a part of said potentiometer and rotatable with said shaft, means on said enclosure cooperable with said stop arm to limit rotation of said shaft, means by which said enclosure may be attached to an accordion grill, and conductor means to said potentiometer within said enclosure.

13. The structure of claim 12 and including a tubular wire container within said enclosure, said container including loops of wire forming a part of said conductor means.

References Cited in the file of this patent

UNITED STATES PATENTS

| | | |
|---|---|---|
| 2,439,551 | Teikoski | Apr. 13, 1948 |
| 2,460,408 | Babicky | Feb. 1, 1949 |
| 2,658,420 | Pompili | Nov. 10, 1953 |
| 2,716,370 | Sano | Aug. 30, 1955 |
| 2,773,943 | Paleschook | Dec. 11, 1956 |
| 2,798,397 | Frigo et al. | July 9, 1957 |
| 2,821,879 | Sano | Feb. 4, 1958 |